May 29, 1934.                C. HUTTLESTON                1,960,441
                        TROLLEY WIRE LUBRICATING DEVICE
                        Filed April 29, 1931      2 Sheets-Sheet 1
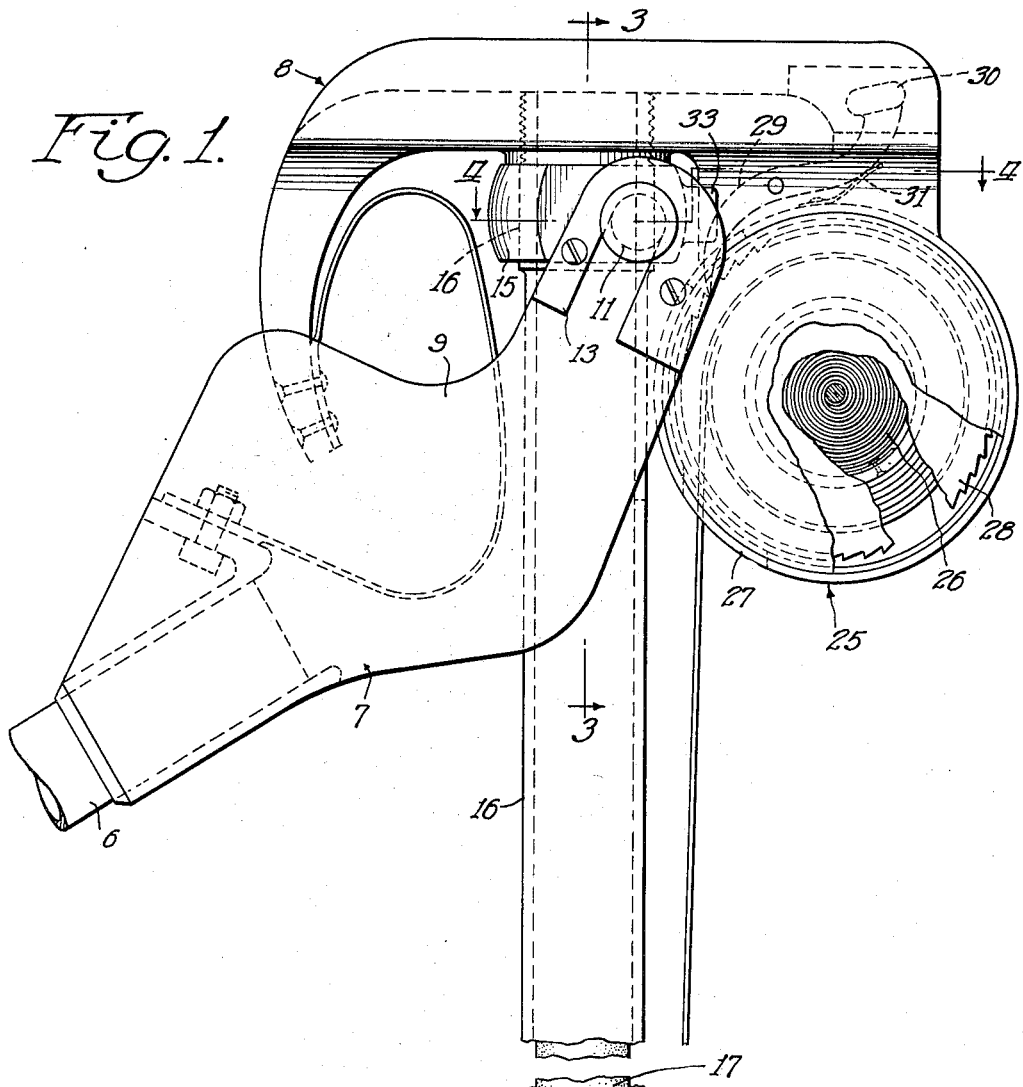
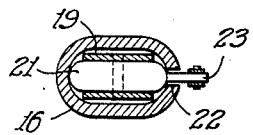
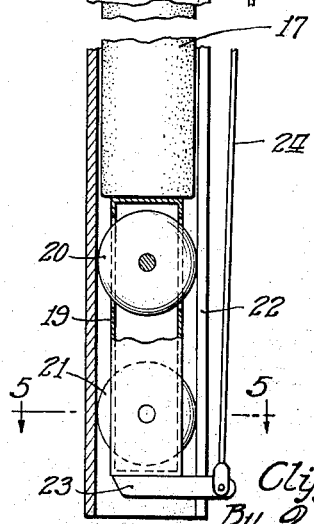
Inventor
Clifford Huttleston May 29, 1934.    C. HUTTLESTON    1,960,441
TROLLEY WIRE LUBRICATING DEVICE
Filed April 29, 1931    2 Sheets-Sheet 2
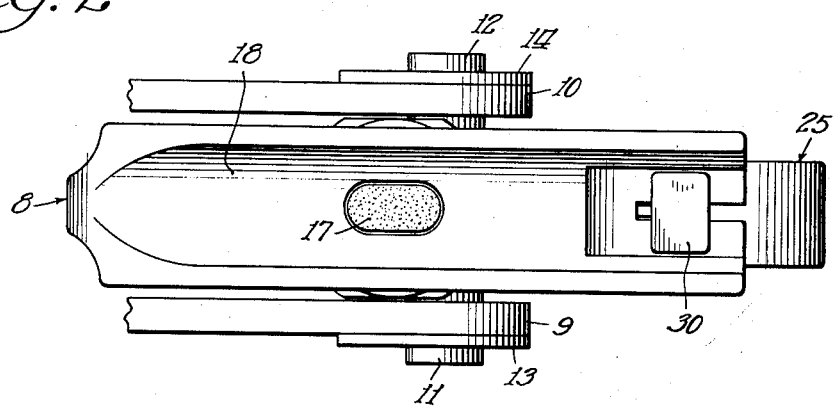
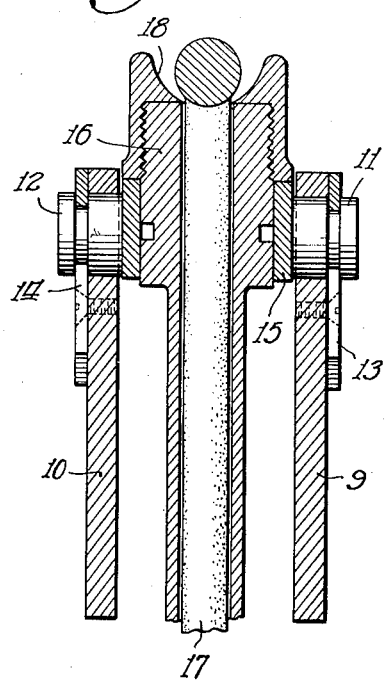
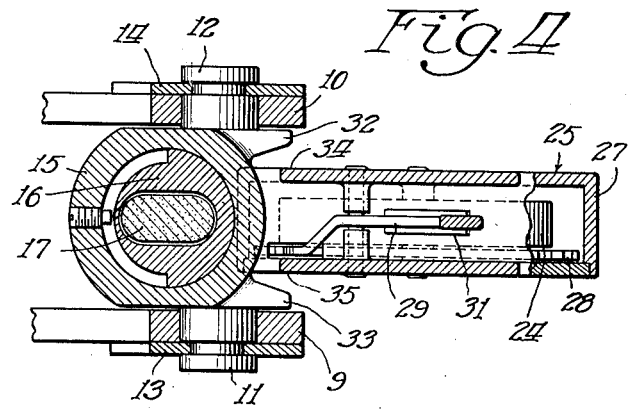
Inventor
Clifford Huttleston Patented May 29, 1934

1,960,441

UNITED STATES PATENT OFFICE 1,960,441

TROLLEY WIRE LUBRICATING DEVICE

Clifford Huttleston, Waukegan, Ill., assignor of one-third to Caesar Antoniono and one-third to George T. Hellmuth, both of Wilmette, Ill.

Application April 29, 1931, Serial No. 533,708

10 Claims. (Cl. 184—15)

My invention relates to lubricating methods and devices and more specifically to a lubricating method and device for applying a lubricant to trolley wires and the like.

It is the principal purpose of my invention to provide a method and a device of this character by which the lubricant can be applied most advantageously as a solid stick lubricant.

My invention contemplates also the provision of a novel means whereby to control automatically the feeding of the lubricant to avoid waste or loss thereof.

In carrying out my invention, I preferably also employ means whereby the same may be operated either with the trolley collecting current from the wire or with a dead pole not connected for collecting currents.

I will describe the preferred form of my invention by reference to the accompanying drawings in which—

Fig. 1 is a side view of a current collecting shoe having associated therewith the lubricating mechanism;

Fig. 2 is a top plan view of the current collecting shoe and lubricant;

Fig. 3 is a section substantially on the line 3—3 of Fig. 1 through only the upper portion of the device;

Fig. 4 is a horizontal section substantially along the lines 4—4 of Fig. 1; and

Fig. 5 is a section along the line 5—5 of Fig. 1.

Referring now in detail to the drawings, the trolley pole is indicated at 6 and carries the main frame 7 and the shoe 8. The main frame 7 has a pair of spaced supporting arms 9 and 10 in which the trunnions 11 and 12 are held by the plates 13 and 14. The trunnions are mounted upon the collar 15 which collar is rotatable about the member 16 screw-threaded into the shoe as indicated in Fig. 1. The swivel connection between the collar and the member 16 facilitates the guiding of the shoe around curves. The connections referred to, in fact, constitute a universal joint connection between the shoe and the supporting frame. The member 16 also serves the purpose of providing a guide and support for a lubricant stick 17 which may be in the form of any solidified lubricant or a lubricant in substantially a solid state. While a solid lubricant may not be essential in all cases, the mechanism I have constructed is particularly adaptable for using solidified lubricant.

The lubricant, as shown most clearly by Fig. 3, is adapted to enter the trolley receiving portion 18 of the shoe substantially centrally of the bottom and between the ends thereof. It is contemplated that the point of delivery of the lubricant may be located at other positions and still be within the scope of the invention. The particular mechanism for feeding this lubricant consists of carriage 19 having the rollers 20 and 21 for guiding the same and means for urging this carriage upwardly. It will be noted that the tubular member 16 is slotted along the back side as indicated at 22 to receive the pusher member 23 which is fixed to the bottom of the carriage and is forced upwardly by the flexible connection 24 to a suitable power device 25. This power device consists in the present instance of a clock spring 26 operating in the casing 27 to continuously exert a pull upwardly on the member 24.

The mechanism thus described tends to move the solid lubricant up against the trolley wire and thus distribute the lubricant on the wire as the shoe slides along.

The invention also embodies a novel means whereby to prevent this feeding of the lubricant upward except when the trolley wire is in engagement with the shoe.

A suitable ratchet wheel 28 is fixed to rotate with the drum driven by the spring 26 and a pawl 29 is adapted to check the rotation of the spring by engagement with the teeth of the ratchet wheel 28. This pawl has an actuating portion 30 extending up into the wire receiving groove of the shoe so that when the trolley wire is in the groove, it presses down upon the portion 30 to depress it against the force of the spring 31 and thus release the pawl member from the ratchet wheel permitting the spring to tighten the connector 24. Of course, if at any time the shoe jumps off the trolley wire or is taken off, the pawl will be released to again stop the ratchet wheel and avoid further feeding of the lubricant.

This provides a very simple and effective means for insuring automatic control of the lubricant feeding means.

The stops 32 and 33 operate to engage the flanges at 34 and 35 to limit the swivel or swinging movement of the shoe.

From the above description, it is believed that the construction and advantages of this device will be clear to those skilled in this art. It is also believed to be obvious that various minor modifications may be made without departing from the scope of the invention.

Having thus described my invention, what I claim as new and desire to secure by Letters Patent is:

1. A trolley lubricating device comprising a shoe for engaging the trolley wire, lubricant feeding means for feeding the lubricant into said shoe to engage the trolley wire, and means controlled by the trolley wire controlling the operation of said feeding means, said means controlled by the trolley including a control element seated in the trolley wire receiving portion of the shoe to be depressed by reception of the trolley wire therein.

2. A trolley wire lubricating device comprising a shoe for engaging the trolley wire, a holder on said shoe having a stick of solid lubricant therein, feeding means for feeding the lubricant to said shoe to engage the trolley wire, and means operable when the shoe becomes disengaged from the trolley wire to stop said feeding means.

3. A trolley lubricating device comprising a shoe for engaging the trolley wire, a holder on said shoe having a stick of solid lubricant therein, feeding means for feeding the lubricant to said shoe to engage the trolley wire, and means operable when the shoe becomes disengaged from the trolley wire to stop the operation of said feeding means, said feeding means including resilient means urging said stick of lubricant upwardly into said holder.

4. A trolley lubricating device comprising a shoe for engaging the trolley wire, a holder on said shoe having a stick of solid lubricant therein, feeding means for feeding the lubricant to said shoe to engage the trolley wire, and means operable when the shoe becomes disengaged from the trolley wire to stop the operation of said feeding means, said feeding means including resilient means urging said stick of lubricant outwardly of said holder, and said means to stop the operation of said feeding means comprising a pawl for controlling the movement of said resilient means.

5. A trolley lubricating device comprising a shoe for engaging the trolley wire, a holder carried by said shoe having lubricant means therein, feeding means for feeding the lubricant means to engage the trolley wire, a carriage arranged in said holder, means operable when the shoe becomes disengaged from the trolley wire to stop the operation of said feeding means, said feeding means including resilient means connected with said carriage for urging said lubricant means outwardly of the holder, and said means to stop the operation of said feeding means comprising a yieldable element for controlling the operation of said resilient means.

6. A trolley lubricating device comprising a shoe for engaging the trolley wire, lubricant feeding means for feeding the lubricant to said shoe to engage the trolley wire, and means controlled by the trolley wire controlling the operation of said feeding means, said feeding means including a control element operatively related to the shoe and adapted to be depressed when engaging the trolley wire.

7. A trolley lubricating device comprising a shoe for engaging the trolley wire, lubricant feeding means for feeding the lubricant to said shoe to engage the trolley wire, and a pivotal element adapted to normally continuously engage the trolley wire for controlling the operation of said feeding means.

8. A current collector and lubricating device comprising a shoe for engaging a trolley wire, lubricant feeding means for feeding the lubricant to engage the trolley wire, and means of a yieldable character adapted to normally continuously engage the trolley wire for controlling the operation of said feeding means.

9. A current collector and lubricating device comprising a shoe for engaging a trolley wire, lubricant feeding means for feeding the lubricant to engage the trolley wire, and means operatively related to said feeding means adapted to normally continuously engage the trolley wire in a manner to control the actuation of said feeding means, said feeding means being inoperable when said means operatively related thereto becomes disengaged from the trolley wire.

10. A trolley lubricating device comprising a shoe for engaging the trolley wire, a holder arranged in a depending position carried by said shoe having lubricant means therein, feeding means for feeding the lubricant means into said shoe to engage the trolley wire, a carriage having wheels arranged in said holder with the wheels engageable with the walls of the holder, means operable when the shoe becomes disengaged from the trolley wire to stop actuation of said feeding means, said feeding means including resilient means connected to said carriage for urging said lubricant outwardly of the holder, and said means to stop actuation of the feeding means comprising a yieldable element arranged adjacent the trailing end of the shoe for controlling the operation of said resilient means.

CLIFFORD HUTTLESTON.